United States Patent [19]

Hudgins

[11] Patent Number: 5,031,956
[45] Date of Patent: Jul. 16, 1991

[54] CLAMP FOR SECURING TARPAULIN OVER PICK-UP TRUCK BED

[76] Inventor: Virgil Hudgins, P.O. Box 542, Stevenson, Wash. 98648

[21] Appl. No.: 566,267

[22] Filed: Aug. 13, 1990

[51] Int. Cl.$^5$ ............................................. B60P 7/04
[52] U.S. Cl. .................................... 296/100; 24/170; 24/504; 248/499; 248/505
[58] Field of Search ................. 296/100; 24/170, 191, 24/502, 504, 516; 248/499, 505, 510; 292/228, 219, 226

[56] References Cited

U.S. PATENT DOCUMENTS

| | | | |
|---|---|---|---|
| 3,162,914 | 12/1964 | Ireland | 24/170 |
| 4,205,416 | 6/1980 | Williams | 24/191 X |
| 4,210,986 | 7/1980 | Williams | 24/170 X |
| 4,823,707 | 4/1989 | Salsbury et al. | 296/100 X |

FOREIGN PATENT DOCUMENTS 2403041  5/1979  France ................... 24/191

Primary Examiner—Johnny D. Cherry
Assistant Examiner—Gary C. Hoge
Attorney, Agent, or Firm—Milton S. Gerstein

[57] ABSTRACT

A clamp used in securing a tarpaulin over a truck which has upper, open entranceway closed off by clamping lever that is biassed for urging the clamping portion into its clamping state where the clamping portion is positioned in close juxtaposition to the upper open entranceway. Each side wall has an extended slot, each slot having a open end opening into the upper entranceway. Means accessible exteriorly of the main housing for causing rotation of the clamping lever into its unclamping position is also provided, whereby a skirt portion of a tarpaulin or the like, may be inserted into the entranceway and into the first open ends of the slots and clamped by the clamping portion of the clamping lever. The rear wall has a downwardly-extending portion and a hole formed in it for receiving a cord therethrough, whereby the clamp may be secured to the frame of a truck and the like. In the preferred embodiment, the opening of the lever is achieved by bending the intermediate section of a compression spring in a direction away from the clamping position of the lever. The same structure may also be used as a clip-board, whereby bending the intermediate section of the compression spring, will automatically unclamp a piece of paper or the like.

17 Claims, 4 Drawing Sheets

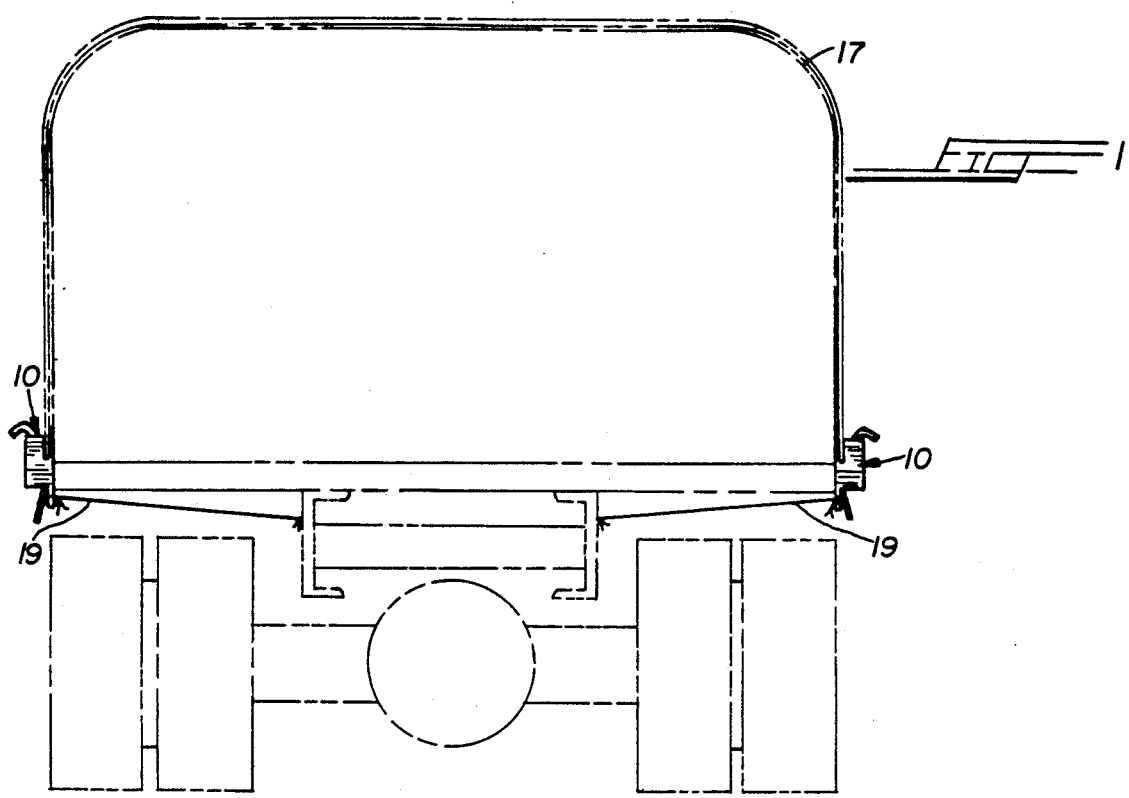
FIG. 1
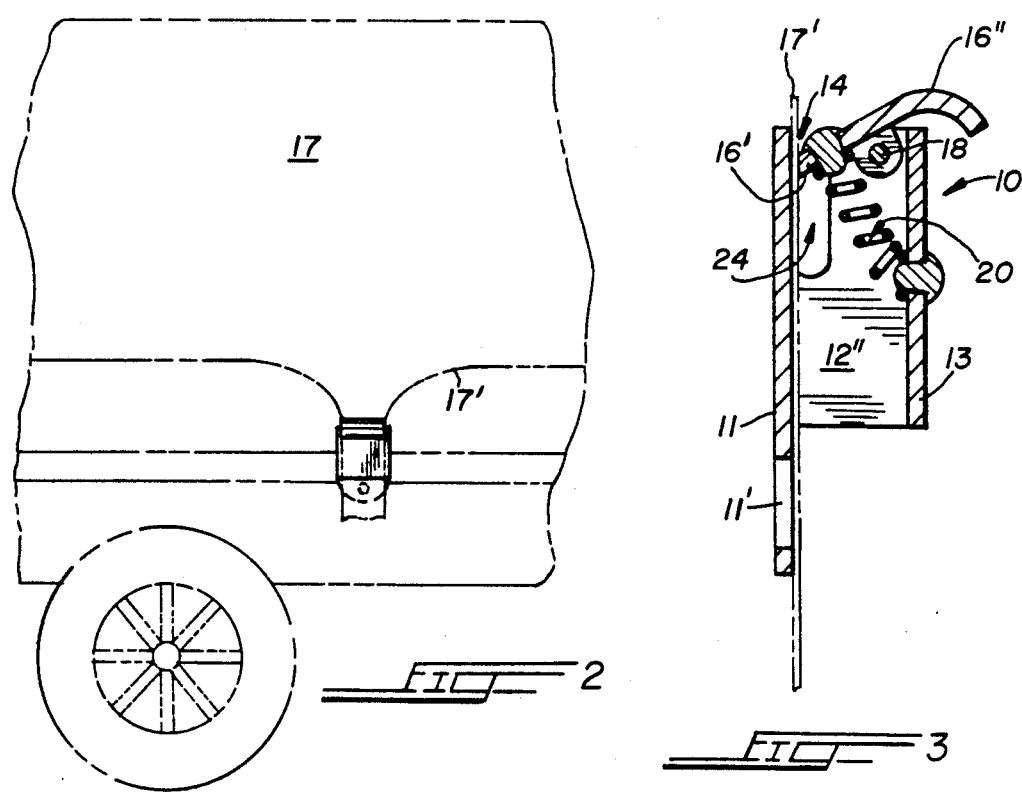
FIG. 2
FIG. 3

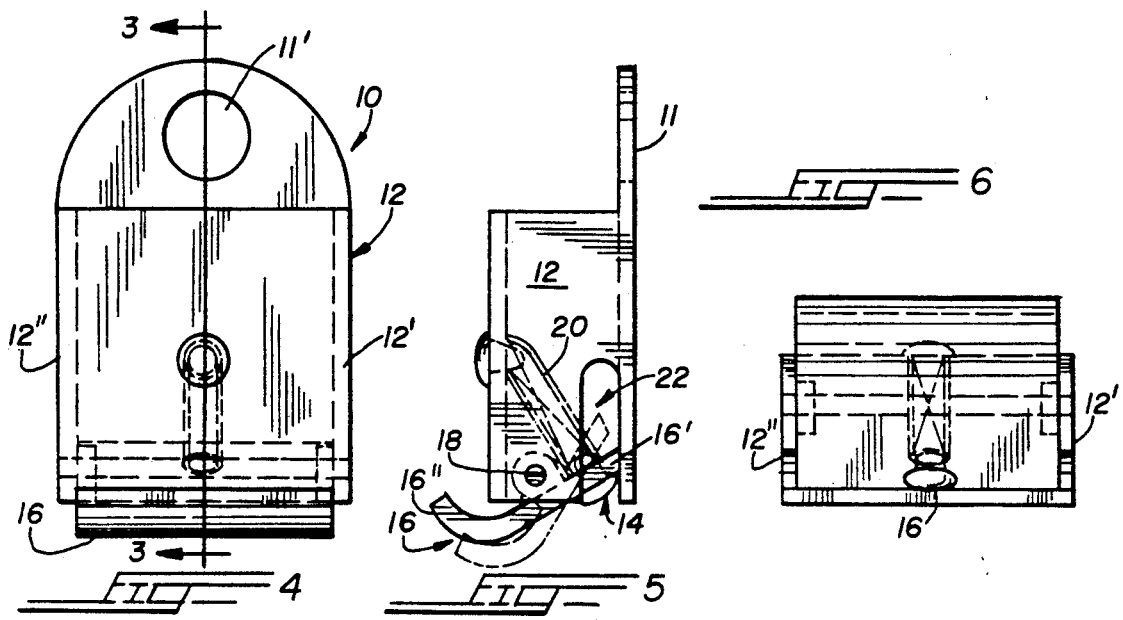
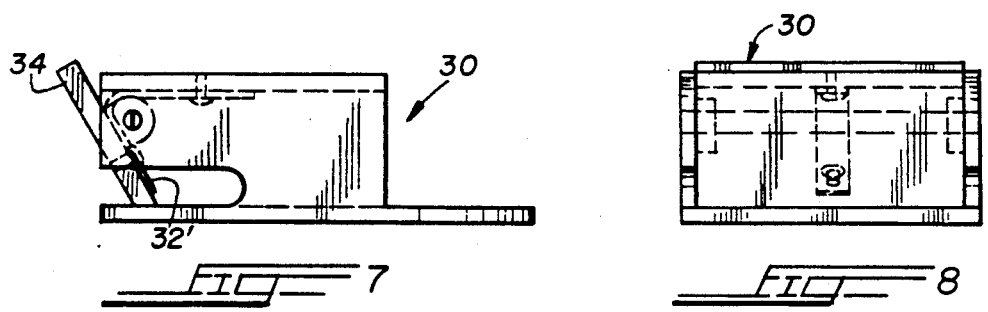
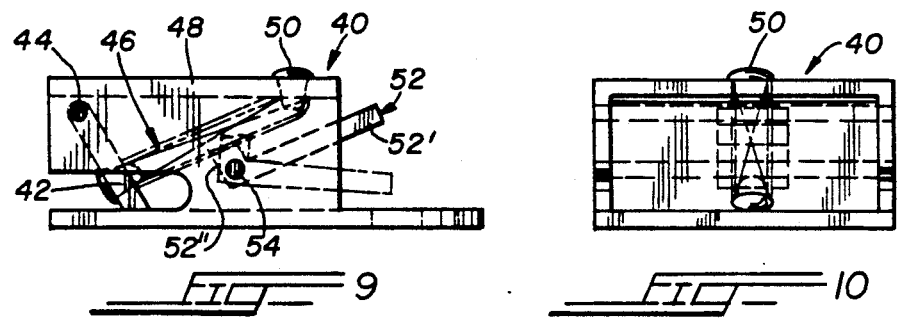
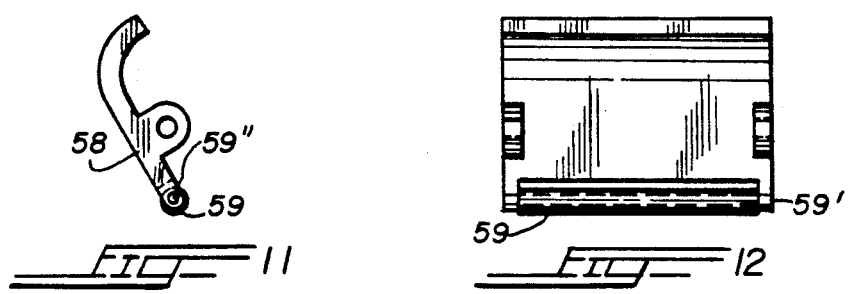

CLAMP FOR SECURING TARPAULIN OVER PICK-UP TRUCK BED

BACKGROUND OF THE INVENTION

The present invention is directed to a clamp for securing a tarpaulin over a bed of a pick-up truck, so that the tarpaulin is secured fast in place in an easy, fast and efficient manner. When using the bed of a pick-up truck, articles, equipment, goods, and the like are stored therein and covered by a tarpaulin, or similar covering, in order to protect the wares from the elements, such as rain and snow. Typically, the securement of the tarpaulin to the truck has been accomplished by inserted cords or ropes through eyelets formed in the peripheral edge or skirt of the tarpaulin, and thereafter tying the cord or rope to a convenient portion of the truck, whereby the tarpaulin is held in place over the contents in the truck bed. However, it is a common problem that the tarpaulin fabric splits or breaks at the eyelets, because of the stress created by the fastened cords or ropes passing therethrough. When these eyelets are broken or torn, then that portion of the skirt of the tarpaulin is no longer fastened down. If a number of such eyelets become torn, then a major portion of the contents in the truck-bed will become exposed to ambient conditions, effectively negating any benefits of the use of the tarpaulin. The present invention has eliminated the use of the eyelets of the conventional tarpaulin, and secures the skirt of the conventional tarpaulin to the truck via a plurality of clamps that clamp therein lower skirt portions of the tarpaulin.

SUMMARY OF THE INVENTION

It is the primary objective of the present invention to provide a clamp for use in securing a tarpaulin to a truck-bed, whereby by using a plurality of such clamps, a tarpaulin may secured fast over a truck-bed, in order to protect the contents i the truck-bed.

It is another objective of the present invention to provide such a clamp that is easily and quickly clamped to a skirt portion of a tarpaulin, as well as unclamped therefrom, which clamp is secured to a part of the truck via a cord or rope for holding the tarpaulin in place over the truck-bed.

It is another objective of the present invention to provide such a clamp that is normally biassed into its closed, clamping state, and only opened by operating a lever opposing the biassing forces, such lever, in the preferred embodiment, operating directly on a middle section of the biassing spring in order to alter the direction of the biassing force for closing or opening the clamp.

The clamp of the invention used in securing a tarpaulin, and the like, over a truck bed, or other vessel, comprises a main housing having at least a partial hollow interior, and defining an upper, open entranceway, with the main housing comprising a front wall, rear wall, and a pair of side walls, and a clamping lever mounted by the main housing, which clamping lever has a clamping portion, means for pivotally mounting the clamping lever for rotation, and biassing means for urging the clamping portion into its clamping state where the clamping portion is positioned in close juxtaposition to the upper open entranceway. Each of the pair of side walls has an extended slot, each slot having a first open end opening into the upper entranceway, and a second lower end. Means accessible exteriorly of the main housing for causing rotation of the clamping lever into its unclamping position is also provided, whereby a skirt portion of a tarpaulin or the like, may be inserted into the entranceway and into the first open ends of the slots and clamped by the clamping portion of the clamping lever. The rear wall has a downwardly-extending portion and a hole formed in it for receiving a cord therethrough, whereby the clamp may be secured to the frame of a truck and the like.

BRIEF DESCRIPTION OF THE DRAWING

The invention will be more readily understood with reference to the accompanying drawing, wherein: FIG. 1 is an end view of a truck bed with a tarpaulin draped thereover and secured in placed with the clamps of the present invention;

FIG. 2 is a side view thereof;

FIG. 3 is a cross-sectional view taken along line 3—3 of FIG. 4 showing a first version of the clamp of the invention used in FIGS. 1-2 in more detail;

FIG. 4 is a front view of the clamp shown in FIGS. 1 and 2;

FIG. 5 is a side view thereof;

FIG. 6 is a top view thereof;

FIG. 7 is a side view showing a second embodiment of the clamp of the invention;

FIG. 8 is an end view thereof;

FIG. 9 is a side view showing a third embodiment of the clamp of the invention;

FIG. 10 is an end view thereof;

FIG. 11 is a plan view showing a clamping lever with lower roller that may be used in any of the embodiments of the clamp of the invention;

FIG. 12 is a front view thereof;

FIG. 19 is a top view plan view showing a clamp similar to the clamp of FIGS. 9 and 10 used as a clip board for clamping an edge of a piece of paper, or the like;

DETAILED DESCRIPTION OF THE INVENTION

Figure 13:
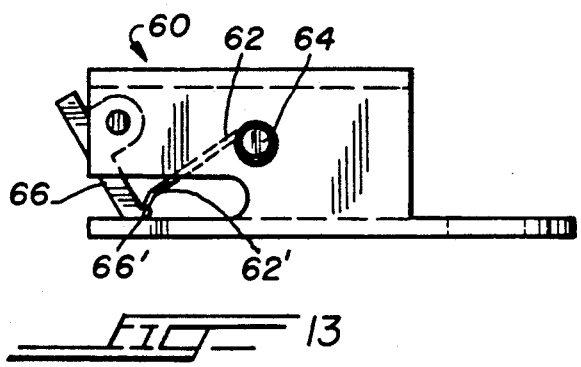
FIG. 13 is a side view showing a fourth embodiment of the clamp of the invention.

Referring to the drawings in greater detail, and for now to FIGS. 1-6, there is shown a first embodiment of a clamp used in holding down a tarpaulin over a truck-bed of a pick-up truck. A plurality of these clamps are used about the lower skirt portion of the tarpaulin. The clamp 10 is made of any suitable metal or alloy, and has a main housing 12 having an interior hollow volume, which defines an upper entranceway 14 through which a lower skirt portion of a tarpaulin is inserted to be clamped thereby. The main housing has a front wall 11, a rear wall 13, and a pair of side walls 12', 12''. Mounted at the upper entranceway 14 is a biassed, clamping lever arm 16 via a pivot pin 18. The lever arm 16 extends substantially the full width of the entranceway, as seen in FIG. 4. A first portion 16' of the lever arm 16 projects interiorly into the main housing, while a second portion 16" projects outwardly thereof. The second portion 16" is accessible to the hand, so that the lever arm may be pivoted into its open, releasing state by pushing on the lever portion 16" in the counterclockwise direction when viewing FIG. 5, to overcome the biassing force of a compression spring 20 mounted in the interior of the main housing. The spring 20 has a first end fixedly connected to an interior-facing section of the first portion 16' of the lever arm 16, and a second end fixedly connected to an interior wall surface of the main housing as shown in FIG. 3. The main housing has a pair of side walls 12', 12" in the forward portion of each is provided a linear or straight cutout or guide slot 22, 24, respectively, which receive the lateral, outer portions of the lower skirt portion of the tarpaulin clamped by the clamp 10, these slots 22, 24 allowing and accommodating easy insertion of the skirt portion into the hollow interior of the main housing, whereby this skirt portion may be clamped via the lever arm portion 16'. The lower end of the rear wall 11 is extended downwardly as compared with the other walls of the main housing 12, and has a hole 11' formed therein through which passes a cord or rope for securing the clamp 10 to an available portion of the truck-bed or frame of the truck proper, in the manner shown in FIGS. 1 and 2. As shown in FIGS. 1 and 2, a tarpaulin 17, after having been draped over the bed of a pick-up truck, or the like, is tied to the truck-bed or truck-frame by using a plurality of clamps 10 spaced apart about the lower, circumferential skirt 17' of the tarpaulin 17, which clamps are secured to available truck-frame portions via ropes or cords 19 passing through the hole 11' of the respective clamp 10. In this manner, the plurality of clamps secure the tarpaulin to the truck-bed without the problem of having the skirt of the tarpaulin break or tear, which can occur when the rode or cord 19 is directly connected to the skirt portion of the tarpaulin via eyelets formed in the skirt portion. The lower end of the clamping lever is a canted, flat surface to allow for the rotation thereof into and out of its clamping position against the rear wall adjacent the entranceway.

FIGS. 7 and 8 show a second embodiment of a clamp that may be used for holding down the tarpaulin 17 on a truck-bed. The clamp 30 is similar to the clamp 10 with the difference being that instead of a compression spring 20, a spring clip 32 is used for urging the clamping lever arm 34 in the clockwise direction into its clamping position. The spring clip 32 has a first downwardly-extending, angled portion 32' which is parallel to and flush with the interior-facing portion of the lever arm 34, and a horizontal portion 32" secured to the interior-facing surface of the forward wall of the main housing of the clamp 30, as seen in FIG. 7. The operation, use and function of the clamp 30 is the same as the clamp 10.

A third and preferred embodiment of the clamp is shown in FIGS. 9 and 10. This clamp 40 is different from the other clamps in that there is provided a clamping lever arm 42 which is entirely within the interior of the main housing of the clamp 40. The lever arm 42 is pivotally mounted in the main housing via a pivot rod 44. The lever arm 42 is normally biassed in the clockwise direction when viewing FIG. 9 via a compression spring 46, having a first end fixed to an interior-facing portion of the lever arm, and a second end fixed to the interior-facing surface of the front or forward wall 48 by a rivet 50 or the like. Operatively associated with the spring 46 is an actuator arm 52 defining a longer leg portion 52' which extends outwardly from the lower exit mouth or opening of the main housing, whereby it is accessible to the hand. The actuator arm 52 also has a shorter leg portion 52" extending substantially perpendicularly to the longer leg portion 52' and from the interior end thereof. A pivot shaft 54 pivotally mounts the actuator arm, which pivot shaft extends between the two side walls of the main housing of the clamp 40. The width of the actuator arm as seen in FIG. 10, is preferably greater than the width of the spring 46. The actuator arm 52 is used for bending the spring 46 along a middle or intermediate portion thereof. When the actuator arm 52 is rotated in the clockwise direction when viewing FIG. 9, the shorter leg portion 52" is raised and contacts the middle or intermediate portion of the spring, to thereby bend the spring, which effectively changes the angle of bias of the spring portion connected to the clamping lever arm 42. This change of angle of the bent spring is the same as the bent spring shown in FIG. 20. By so changing the angle of the spring by pulling up the intermediate portion of the spring, the total spring length is increased, and the portion between the clamping lever and the leg portion 52" is converted into a tension spring, whereby clamping lever arm 42 is urged in the counterclockwise direction, when viewing FIG. 9, into its open, releasing state. Such rotation of the actuator arm 52 is easily and simply accomplished. The limit to such movement is provided by the extended lower portion of the rear wall of the clamp 40, which extended portion includes the hole for passing the rope or cord 19 therethrough. This limit effectively prevents irreversible damage from being done to the spring 46 by over-bending the intermediate portion of the spring. The lower extension of the rear wall 40' also provides a convenient grip when rotating the actuator arm in the clockwise direction, so that the actuator arm may be squeezed open by a hand gripping both the outer, exterior end of the leg portion 52' and the lower extension of the rear wall 40'. The spring automatically returns to its original, linear configuration upon the release of the actuator arm.

Referring to FIGS. 11 and 12, a modification of any of the embodiments of clamps is shown, in which the clamping lever arm 58 of any of the clamps is provided with a lower roller 59, which roller is rotatably mounted on the end of the clamping lever arm at the portion that contacts the skirt portion of the tarpaulin. The use of the roller 59 helps to prevent damage from being done to the skirt of the tarpaulin as it is clamped in place, and also allows for easier removal of the skirt portion when the lever is rotated to its releasing position. Preferably, the roller 59 extends the full width of the clamping lever arm. The roller 59 is rotatable mounted by a journal bearing 59'.

Figure 14:
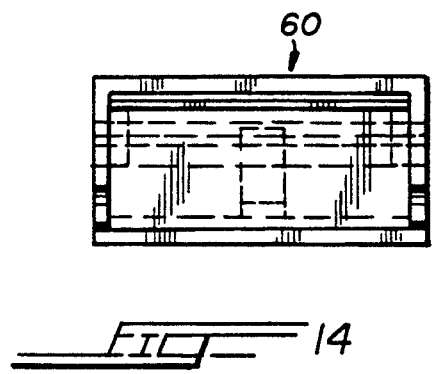
FIG. 14 is an end view thereof.

FIGS. 13 and 14 show a fourth embodiment of a clamp. The clamp 60 is the same as the clamp 30, with the difference being that the spring clip 62 is a straight piece having its inner end coiled about a mounting stud 64. The lower end of the clamping lever arm is provided with a lip or bead 66' against which the slightly-bent end 62' of the spring clip 62 abuts for urging the clamping lever in the clockwise, clamping direction.

Figure 15:
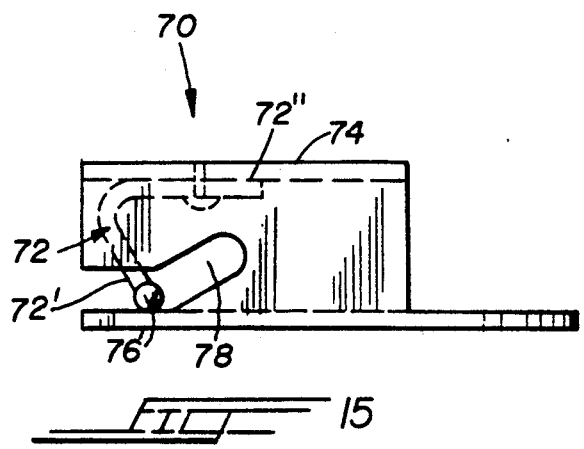
FIG. 15 is a side view showing a fifth embodiment of the clamp of the invention.
Figure 16:
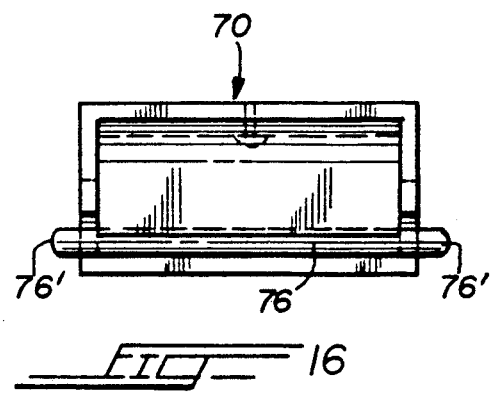
FIG. 16 is an end view thereof.

A fifth embodiment of the clamp is shown in FIGS. 15 and 16. The clamp 70 has a bent clamping lever 72 which itself is formed of spring-steel. The clamping lever 72 has a first downwardly-extending leg portion 72' which intersects the upper, open entranceway of the main housing for clamping the skirt portion of the tarpaulin in place, and a horizontal leg portion 72" affixed to the interior surface of the forward wall 74 of the main housing of the clamp 70. The spring-steel clamping lever is normally biassed so that the two leg portions thereof are urged away from each other. The lower end of the leg portion 72' is provided with an elongated, rounded, horizontal member 76 defining ends 76' and 76". The ends 76', 76" ride in upwardly sloped guide slots 78 and project laterally outwardly therefrom, by which the leg portion 72' may be forcibly rotated in the counterclockwise direction, when viewing FIG. 15, so as to open the clamp. The width of the clamp 70 is preferably such that one hand alone can grip both laterally outwardly projecting ends 76', 76" for opening the clamp 70, while the other hand holds the skirt portion of the tarpaulin for inserting it into the open entranceway of the main housing of the clamp 70 and into the sloped slots 78.

Figure 17:
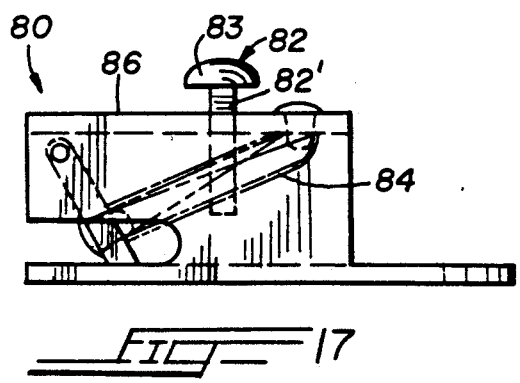
FIG. 17 is a side view showing a sixth embodiment of the clamp of the invention.
Figure 18:
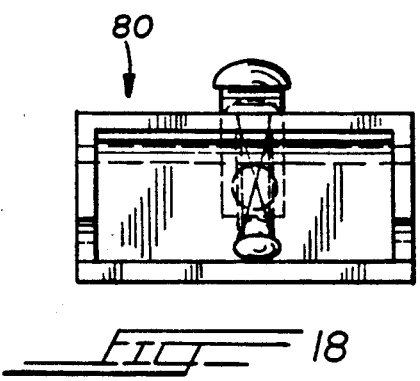
FIG. 18 is an end view thereof.

A sixth embodiment of the clamp is shown in FIGS. 17 and 18. This clamp 80 is similar to the clamp 40, but instead of having a pivotal actuator arm, for bending the spring, there is provided a vertically movable stud 82. The stud 82 has a lower end fixedly attached to a middle or intermediate of the compression spring 84. The stud may be threaded so that as it is rotated, the intermediate portion of the spring will lifted up thereby. Alternatively, the stud need not be threaded, but may rest freely in the opening formed in the forward wall 86 of the main housing of the clamp 80, whereby the stud's shaft 82' may be freely slid outwardly by pulling on the enlarged head 83 thereof. The stud is prevented from escaping out of the hole by virtue of its fixed connection to the spring. Upon releasing the stud, the spring 84 will automatically return to its original, linear configuration.

Figure 19:
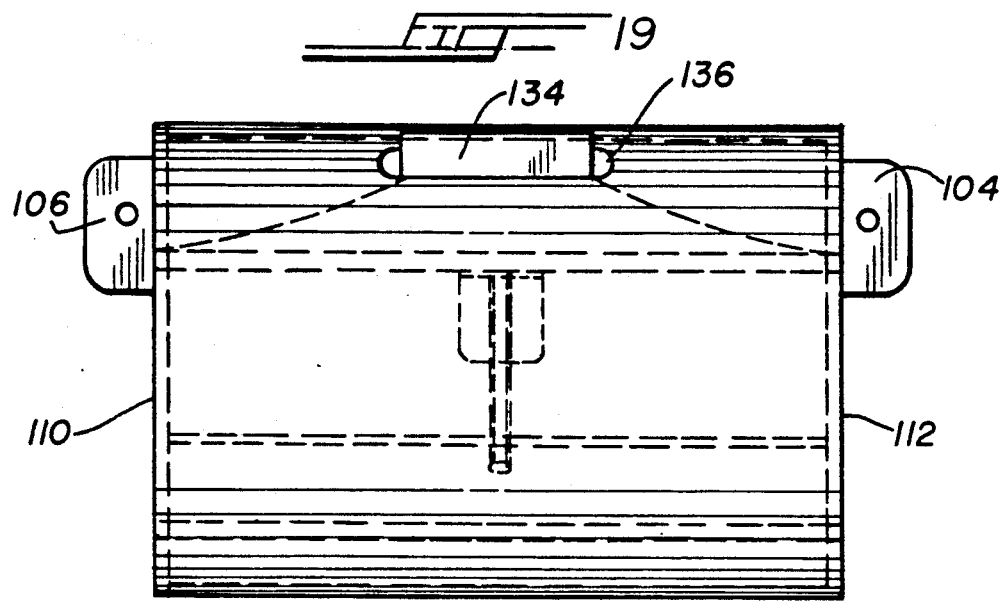
Figure 20:
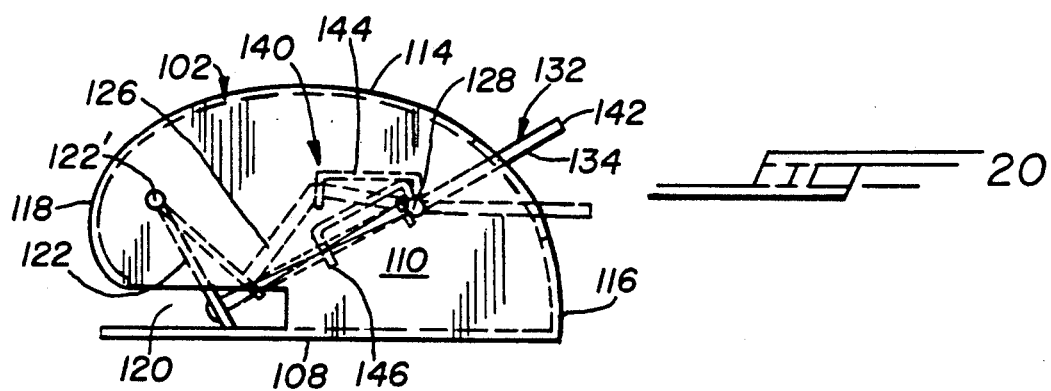
FIG. 20 is a side view thereof.
Figure 21:
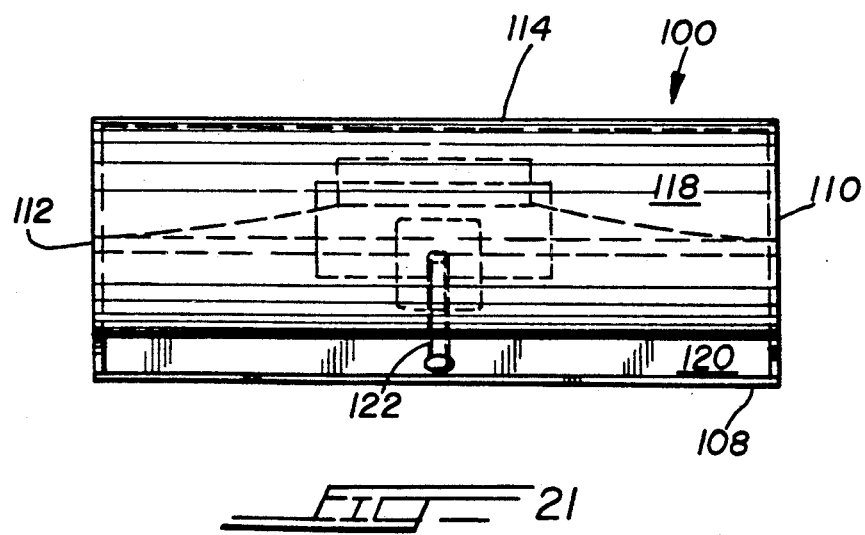
FIG. 21 is a front view thereof.

Referring to FIGS. 19-21, there is shown a modification of the clamp of FIGS. 9 and 10, for use as a clip, such as for a clip-board, note-clip, and the like. The clip 100 includes a main housing 102 defining a hollow interior. A pair of laterally-projecting ears 104, 106 are also provided, each ear having a hole, for securing the clip to a surface, as desired. The main housing 102 has a bottom support surface 108, a pair of side walls 110, 112, a top wall 114, a rear wall 116 and a front wall 118. The top, front and rear walls may form a dome shape, as shown in FIG. 20. The entranceway is formed between the lower end of the forward wall 118 and the forward portion of the bottom wall 108, with a pair of guide slots 120 being provided in the pair of side walls 110, 112 to help form the entranceway. A pivotally-mounted clamping lever or door 122 is mounted interiorly in the main housing in the area of the entranceway, as clearly shown in FIG. 20 via a pivot shaft 122' connected between the two side walls. The door preferably extends the full width of the entranceway, and is spring-biassed by a compression spring 126 fixedly connected at one end to a lower interior portion of the door 122, and at its other end to a pivot post 128 mounted between the two side walls 110, 112, which spring urges the door in the clockwise direction when viewing FIG. 116, into its clamping, closed position. The pivot post 128 rotatably mounts an actuating member 132 having a first leg portion 134 extending from the pivot post 128 rearwardly and outwardly of the top wall 114 via an opening 136 formed therein, as seen in FIG. 19, whereby the actuating member is accessible from the outside. Connected to the interior end of the leg portion 132 is a second leg portion 140 extending from the pivot post 128 and inwardly therefrom. This second leg portion is a bracket-like member having a first leg portion 142 connected to and perpendicular from the interior end of the leg portion 142, and has an intermediate portion 144 connected to the upper end of the portion 142 and also connected to a third portion 146 parallel to the first portion 142. The portion 146 is longer than the first portion 142, and receives therethrough the spring 126 via a hole, or the like. As the lever 142 is rotated in the clockwise direction when viewing FIG. 20, the bracket member 140 is rotated therewith about the pivot post 128, thereby lifting the intermediate portion of the spring 126 into a bent configuration shown in FIG. 20, to thereby release the clamping door 122 and raise it to its upper, opened state, in the same manner as the clamp of FIGS. 9 and 10. Releasing the lever 142, will allow the spring to return to its normal, linear configuration, and into its compression-spring status for urging the door closed into its clamping state. It is also possible to use the version shown in FIGS. 9 and 10, or the version shown in FIGS. 17 and 18 as well for achieving the bending of the spring.

While embodiments of the invention have been shown and described, it is to be understood that numerous changes and modifications may be made therein without departing from the scope, spirit and intent of the invention as set forth in the appended claims.

What I claim is:

1. A clamp for use in securing a tarpaulin, and the like, over a truck bed, or other vessel, comprising:
    a main housing having at least a partial hollow interior, and defining an upper, open entranceway;
    said main housing comprising a front wall, rear wall, and a pair of side walls;
    a clamping lever mounted by said main housing, said clamping lever comprising a clamping portion, means for pivotally mounting said clamping lever for rotation, and biassing means for urging said clamping portion into its clamping state thereof where said clamping portion is positioned in close juxtaposition to said upper open entranceway;
    each of said pair of side walls comprising an extended slot, each said slot having a first open end opening to said upper entranceway, and a second lower end;
    means accessible exteriorly of said main housing for causing rotation of said clamping lever into its unclamping position, whereby a skirt portion of a tarpaulin or the like, may be inserted into said entranceway and into said first open ends of said slots and clamped by said clamping portion of said clamping lever; and
    said rear wall having a downwardly-extending portion and a hole formed therein for receiving a cord therethrough, whereby the clamp may be secured to the frame of a truck and the like, said downwardly-extending portion projecting in a direction way from said entranceway.

2. The clamp according to claim 1, wherein said means for biassing comprises a compression spring; and said means for causing rotation of said clamping lever comprises an extension of said clamping lever, said extension projecting forwardly therefrom and out from said entranceway; said clamping portion contacting the interior-facing surface of said rear wall directly adjacent said entranceway.

3. The clamp according to claim 2, wherein said clamping portion comprises a bottom canted surface for contacting said interior-facing surface of said rear wall when said clamping lever is in its clamping position.

4. The clamp according to claim 2, wherein said clamping portion comprises a bottom roller surface for contacting said interior-facing surface of said rear wall when said clamping lever is in its clamping position.

5. The clamp according to claim 2, wherein each said slot of each said side wall is in close juxtaposition with said rear wall, and said means for pivotally mounting said clamping lever comprises a pivot rod mounted by and between said pair of side walls, said clamping portion extending from said pivot rod toward said rear wall, said compression spring comprising a first anchor means for securing a first end thereof to said clamping portion, and a second anchoring means for securing a second end thereof to the interior-facing surface of said front wall.

6. The clamp according to claim 2., wherein said means for biassing comprises a compression spring; said compression spring comprising a first end, a second end, and an intermediate section, said means for biassing further comprising a first anchor means for securing said first end to said clamping portion, and a second anchoring means for securing said second end to an interior-facing surface portion of said front wall; said means accessible exteriorly of said main housing for causing rotation of said clamping lever into its unclamping position comprises means for bending said spring at said intermediate section.

7. The clamp according to claim 6, wherein said means for bending said spring at said intermediate section comprises a rotatable actuator arm having a first leg portion for contacting said intermediate section, and a second leg portion extending from said first leg portion, said second leg portion comprising a section thereof projecting exteriorly of said main housing in order to provide access thereto, and means for rotatably mounting said actuator arm, whereby rotating said actuator arm in a first direction causes said first leg portion to bend said intermediate section, and rotation in the opposite direction, allows said intermediate section to straighten out.

8. The clamp according to claim 7, wherein said means for rotatably mounting said actuator arm comprises a pivot shaft mounted by and between said pair of side walls, said exteriorly-projecting section of said second leg portion projecting downwardly and past the lower ends of said forward wall and said side walls.

9. The clamp according to claim 8, wherein said exteriorly-projecting section in the state thereof when said first leg portion bends said intermediate section lies in close juxtaposition to the interior-facing surface of said downwardly-extending portion of said rear wall, whereby said actuator arm may be rotated by gripping said exteriorly-projecting section and said downwardly-extending portion with one hand and squeezing.

10. The clamp according to claim 9 wherein said first leg portion bends said intermediate section in a direction away from said pair of slots and away from said clamping portion of said clamping lever arm.

11. The clamp according to claim 6, wherein said means for bending said spring at said intermediate section comprises a slidable member having a first end operatively associated with said intermediate section, and a second end projecting exteriorly of said main housing for access thereto.

12. The clamp according to claim 2, wherein said means for biasing and said clamping lever comprise a spring-clip having a first leg portion secured to the interior facing surface of said forward wall and a second leg portion integrally connected thereto, said second leg portion defining said clamping lever; said means for causing rotation comprising laterally-projecting portions of said clamping portion of said clamping ever, one said laterally-projecting portion projecting through and out from one said slot of one said side wall, and the other said laterally-projecting portion projecting through and out from said slot of the other said side wall, each said slot having a sloping portion in which said laterally-projecting portions slide when said clamping lever is rotated, said laterally-projecting portions being gripped by a hand in order to rotate said clamping lever to its unclamping position.

13. The clamp according to claim 1, comprising a plurality of clamps in combination with a pick-up truck, said pick-up truck comprising a bed for storing, and a cover for covering said bed of said truck; said cover having a skirt portion; said clamps clamping respective portions of said skirt portion at spaced intervals; and a plurality of cord means for securing said clamps to said truck, each said cord means comprising a cord passing through a respective said hole of said rear-wall extension of a respective said clamp and tied to a portion of said truck for holding said cover in place over said bed.

14. The clamp according to claim 1, further comprising a cord passing through said hole of said rear-wall extension for securing the clamp in place.

15. A method of operating a lever that is biassed into a closed state and rotatable to an open state, the lever being urged into its closed state by a compression spring, said method comprising:
 a) bending an intermediate section of the compression spring in a direction away from the closed state of the lever by providing a transverse force on the intermediate section of the spring directed transverse to the length of the spring;
 b) said step (a) inherently causing the compression spring to rotate the lever into its open state; and
 c) removing the transverse force; and
 d) allowing the spring to assume its original, unbent state.

16. The method according to claim 15, wherein said step (a) comprises providing said transverse force by means of a pivotal lever arm.

17. The method according to claim 16, wherein said step (a) comprises limiting the maximum amount of deflection of the intermediate section of the spring in order to prevent damage to the spring.

* * * * *